US012780331B2

(12) United States Patent
Scott et al.

(10) Patent No.: US 12,780,331 B2
(45) Date of Patent: Nov. 3, 2026

(54) WIDE OPENING TAILGATE WITH INTEGRATED STEP

(71) Applicant: Scout Motors Inc., Tysons, VA (US)

(72) Inventors: Jason Scott, Farmington Hills, MI (US); Randy Frank, Tysons, VA (US); Kenneth Trumble, Royal Oak, MI (US)

(73) Assignee: Scout Motors Inc., Tysons, VA (US)

( * ) Notice: Subject to any disclaimer, the term of this patent is extended or adjusted under 35 U.S.C. 154(b) by 299 days.

(21) Appl. No.: 18/660,887

(22) Filed: May 10, 2024

(65) Prior Publication Data

US 2025/0346303 A1 Nov. 13, 2025

(51) Int. Cl.
*B62D 33/027* (2006.01)
*B60R 3/02* (2006.01)

(52) U.S. Cl.
CPC ............ *B62D 33/0273* (2013.01); *B60R 3/02* (2013.01)

(58) Field of Classification Search
CPC ........ B62D 33/0273; B62D 33/03; B60R 3/02
USPC ............................................ 296/50, 57.1, 62
See application file for complete search history.

(56) References Cited

U.S. PATENT DOCUMENTS

| | | | |
|---|---|---|---|
| 4,161,997 | A | 7/1979 | Norman |
| 4,639,032 | A | 1/1987 | Barbour |
| 4,846,487 | A | 7/1989 | Criley |
| 4,848,821 | A | 7/1989 | Llewellyn |
| 5,320,397 | A | 6/1994 | Peterson et al. |
| 5,456,511 | A | 10/1995 | Webber |
| 5,478,130 | A | 12/1995 | Matulin et al. |
| 5,732,995 | A | 3/1998 | Piccariello |
| 5,732,996 | A | 3/1998 | Graffy et al. |
| 5,816,638 | A | 10/1998 | Pool |
| 5,820,193 | A | 10/1998 | Straffon |
| 5,902,000 | A | 5/1999 | Wold |
| 6,042,167 | A | 3/2000 | Pierce et al. |

(Continued)

FOREIGN PATENT DOCUMENTS

| | | | |
|---|---|---|---|
| AU | 2019204842 | A1 | 1/2021 |
| CA | 2366149 | C | 6/2003 |

(Continued)

*Primary Examiner* — Vivek D Koppikar
*Assistant Examiner* — Daniel Guang-Dian Chen
(74) *Attorney, Agent, or Firm* — Meunier Carlin & Curfman LLC

(57) ABSTRACT

An integrated tailgate assembly for a vehicle includes a tailgate moveable between a closed position, an open position, and a step position. The integrated tailgate assembly is configured to provide a stepping surface for a user, to assist with egress and ingress into a vehicle storage compartment. In some implementations, the integrated tailgate assembly includes a first connecting member rotatably coupled to the vehicle. In some implementations, the integrated tailgate assembly includes a second connecting member coupled to the first connecting member and the tailgate. In some implementations, the integrated tailgate assembly includes a deployable platform with a platform cover and a deployable platform grip surface, the deployable platform rotatably coupled to the tailgate and moveable between a stored position with the platform cover flush with the tailgate inner surface and a deployed position with the deployable platform grip surface providing a step.

18 Claims, 3 Drawing Sheets

(56) References Cited

U.S. PATENT DOCUMENTS

| | | | |
|---|---|---|---|
| 6,113,171 | A | 9/2000 | Stearns |
| 6,378,926 | B1 | 4/2002 | Renze et al. |
| 6,422,342 | B1 | 7/2002 | Armstrong et al. |
| 6,454,338 | B1 | 9/2002 | Glickman et al. |
| 6,550,841 | B1 | 4/2003 | Burdon et al. |
| 6,857,680 | B2 | 2/2005 | Fielding |
| 6,905,158 | B1 | 6/2005 | Bastian |
| 6,942,272 | B2 | 9/2005 | Livingston |
| 6,976,820 | B2 | 12/2005 | Sandy |
| 6,991,277 | B1 | 1/2006 | Esler |
| 7,021,689 | B1 | 4/2006 | Weisbeck |
| 7,055,838 | B2 | 6/2006 | Lambie |
| 7,090,276 | B1 | 8/2006 | Bruford et al. |
| 7,234,750 | B1 | 6/2007 | Doolittle et al. |
| 7,261,357 | B1 | 8/2007 | Bechen |
| 7,264,253 | B1 | 9/2007 | Cummings |
| 7,347,473 | B2 | 3/2008 | Miller et al. |
| 7,530,619 | B1 | 5/2009 | Bruford et al. |
| 7,628,439 | B1 | 12/2009 | Strong |
| 7,677,626 | B2 | 3/2010 | Hanzel |
| 7,896,419 | B2 | 3/2011 | Elliott et al. |
| 8,070,206 | B2 * | 12/2011 | Zielinsky ........... B62D 33/0273 296/57.1 |
| 8,070,208 | B2 * | 12/2011 | Zielinsky ........... B62D 33/0273 296/57.1 |
| 8,182,013 | B1 | 5/2012 | Alvarado |
| 8,201,869 | B1 * | 6/2012 | Butlin, Jr. ................. B60R 3/02 296/57.1 |
| 8,444,201 | B1 | 5/2013 | Crawford et al. |
| 8,505,944 | B2 | 8/2013 | Genest et al. |
| 9,365,247 | B1 | 6/2016 | Thompson |
| 9,517,711 | B2 | 12/2016 | Krajenke et al. |
| 9,623,803 | B1 * | 4/2017 | Martins ..................... B60R 3/02 |
| 9,956,995 | B1 * | 5/2018 | Neighbors ......... B62D 33/0273 |
| 10,005,396 | B2 | 6/2018 | Spahn et al. |
| 10,543,789 | B1 | 1/2020 | Sullivan et al. |
| 10,801,237 | B2 * | 10/2020 | Hemphill ................ E05C 17/36 |
| 10,994,660 | B2 * | 5/2021 | Ngo ................... B62D 33/0273 |
| 11,110,971 | B2 | 9/2021 | Singer |
| 11,220,301 | B2 | 1/2022 | Robinson et al. |
| 11,260,796 | B2 | 3/2022 | Hemphill et al. |
| 11,312,285 | B2 | 4/2022 | Desimone |
| 11,414,016 | B2 | 8/2022 | Bender |
| 11,427,265 | B2 | 8/2022 | Williamson et al. |
| 11,535,161 | B1 | 12/2022 | Walker |
| 11,643,018 | B2 | 5/2023 | Nania |
| 11,673,507 | B2 | 6/2023 | Verbridge et al. |
| 2002/0070577 | A1 | 6/2002 | Pool et al. |
| 2004/0183326 | A1 | 9/2004 | Tegtmeier |
| 2005/0093326 | A1 | 5/2005 | Miller et al. |
| 2007/0096422 | A1 | 5/2007 | Dolan |
| 2009/0273202 | A1 | 11/2009 | Heaman et al. |
| 2010/0181741 | A1 | 7/2010 | Webb |
| 2010/0230209 | A1 | 9/2010 | Hughes et al. |
| 2012/0126564 | A1 * | 5/2012 | Hausler .............. B62D 33/0273 296/57.1 |
| 2014/0203587 | A1 | 7/2014 | Krishnan et al. |
| 2016/0023691 | A1 | 1/2016 | Bales et al. |
| 2016/0031353 | A1 | 2/2016 | Desimone |
| 2016/0311355 | A1 | 10/2016 | Krajenke et al. |
| 2017/0361878 | A1 | 12/2017 | Loew et al. |
| 2018/0065560 | A1 | 3/2018 | Krishnan et al. |
| 2019/0054961 | A1 * | 2/2019 | Ngo .......................... B60R 3/02 |
| 2021/0155296 | A1 | 5/2021 | Povinelli et al. |
| 2021/0253180 | A1 | 8/2021 | Bruford |
| 2022/0001728 | A1 | 1/2022 | Nania et al. |
| 2022/0009417 | A1 | 1/2022 | Kim et al. |
| 2023/0382306 | A1 | 11/2023 | Brick et al. |

FOREIGN PATENT DOCUMENTS

| | | | |
|---|---|---|---|
| CA | 2972519 | A1 | 1/2019 |
| DE | 202015105315 | U1 | 11/2015 |

* cited by examiner

WIDE OPENING TAILGATE WITH INTEGRATED STEP

BACKGROUND

This disclosure relates to vehicle tailgates. More particularly, this disclosure relates to vehicle tailgates that include steps.

SUMMARY

In some aspects, the techniques described herein relate to an integrated tailgate assembly for a vehicle, the integrated tailgate assembly including: a first connecting member rotatably coupled to the vehicle and movable between a stowed first connecting member position and a step first connecting member position; a second connecting member coupled to the first connecting member; a tailgate coupled to the vehicle and the second connecting member, the tailgate moveable between: a closed position with the first connecting member in the stowed first connecting member position, an open position with the first connecting member in the stowed first connecting member position, and a step position with the first connecting member in the step first connecting member position; and a deployable platform rotatably coupled to the tailgate and moveable between: a stored position, and a deployed position providing a step.

In some aspects, the techniques described herein relate to an integrated tailgate assembly, wherein, in the step position, the tailgate is rotated 130 degrees to 140 degrees from the closed position.

In some aspects, the techniques described herein relate to an integrated tailgate assembly, wherein, in the deployed position, the deployable platform is rotated 180 degrees from the stored position.

In some aspects, the techniques described herein relate to an integrated tailgate assembly, wherein the tailgate defines a cavity sized to receive the deployable platform.

In some aspects, the techniques described herein relate to an integrated tailgate assembly, wherein the cavity defines a cavity width less than a width of the tailgate.

In some aspects, the techniques described herein relate to an integrated tailgate assembly, wherein the cavity includes a first angled wall and a second angled wall joining at a bottom wall, and wherein the second angled wall defines a cavity grip surface configured to be parallel to a floor plane of the vehicle when the tailgate is in the step position and the deployable platform is in the deployed position.

In some aspects, the techniques described herein relate to an integrated tailgate assembly, wherein the second angled wall extends at a platform step angle of 130 degrees to 140 degrees relative to a tailgate inner surface plane.

In some aspects, the techniques described herein relate to an integrated tailgate assembly, wherein the deployable platform includes a first angled surface and a second angled surface extending between a bottom surface and a top surface, the second angled surface defining a deployable platform grip surface and the top surface defining a platform cover configured to inhibit ingress of debris into the cavity.

In some aspects, the techniques described herein relate to an integrated tailgate assembly, wherein the cavity grip surface and the deployable platform grip surface are parallel in the deployed position.

In some aspects, the techniques described herein relate to an integrated tailgate assembly, wherein the first connecting member is a rigid link and the second connecting member is a cable.

In some aspects, the techniques described herein relate to an integrated tailgate assembly, further including a third connecting member coupled between the first connecting member and the vehicle, the third connecting member configured to define the step first connecting member position of the first connecting member.

In some aspects, the techniques described herein relate to an integrated tailgate assembly, wherein the third connecting member is a cable.

In some aspects, the techniques described herein relate to an integrated tailgate assembly, further including a tailgate latch user interface that controls actuation of the first connecting member between the stowed first connecting member position and the step first connecting member position, and the tailgate between the closed position, the open position, and the step position.

In some aspects, the techniques described herein relate to an integrated tailgate assembly, further including a platform user interface that controls actuation of the deployable platform between the stored position and the deployed position.

In some aspects, the techniques described herein relate to an integrated tailgate assembly, wherein the deployable platform includes a platform cover that is flush with an inner surface of the tailgate when the deployable platform is arranged in the closed position.

In some aspects, the techniques described herein relate to an integrated tailgate assembly for a vehicle, the integrated tailgate assembly including: a first connecting member rotatably coupled to the vehicle and movable between a stowed first connecting member position and a step first connecting member position; a second connecting member coupled to the first connecting member; a third connecting member coupled between the first connecting member and the vehicle, the third connecting member configured to define the step first connecting member position; a tailgate coupled to the vehicle and the second connecting member, the tailgate moveable between: a closed position with the first connecting member in the stowed first connecting member position, and a step position with the first connecting member in the step first connecting member position; and a deployable platform rotatably coupled to the tailgate and moveable between: a stored position, and a deployed position providing a step.

In some aspects, the techniques described herein relate to an integrated tailgate assembly, wherein, in the step position, the tailgate is rotated 130 degrees to 140 degrees from the closed position In some aspects, the techniques described herein relate to an integrated tailgate assembly, wherein the tailgate defines a cavity sized to receive the deployable platform.

In some aspects, the techniques described herein relate to an integrated tailgate assembly for facilitating access to a vehicle storage compartment of a vehicle, the integrated tailgate assembly including: a rigid link rotatably coupled to the vehicle and movable between a first rigid link position and a second rigid link position; a first cable coupled to the rigid link; a second cable coupled between the rigid link and the vehicle, the second cable configured to define the second rigid link position; a tailgate coupled to the vehicle and the first cable, the tailgate moveable between: a closed position with the rigid link in the first rigid link position, an open position with the rigid link in the first rigid link position, and an extended position with the rigid link in the second rigid link position; a deployable platform, the deployable platform coupled to the tailgate and sized to be received within an opening in the tailgate, the deployable platform moveable between: a closed position, and an open position; a deployable platform user interface that controls movement of the deployable platform between the closed position and the open position; a tailgate latch user interface that controls movement of the rigid link between the first rigid link position and the second rigid link position and the tailgate between the closed position, the open position, and the extended position; wherein, in the extended tailgate position and the open deployable platform position, a surface of the deployable platform and a surface of the opening in the tailgate form a stepping interface.

In some aspects, the techniques described herein relate to an integrated tailgate assembly, wherein the stepping interface includes a plurality of protrusions or ridges or a textured surface.

This summary is illustrative only and is not intended to be in any way limiting. Other aspects, features, and advantages of the devices or processes described herein will become apparent in the detailed description set forth herein, taken in conjunction with the accompanying figures, wherein like reference numerals refer to like elements.

BRIEF DESCRIPTION OF DRAWINGS

The device is explained in even greater detail in the following drawings. The drawings are merely exemplary and certain features may be used singularly or in combination with other features. The drawings are not necessarily drawn to scale.

DETAILED DESCRIPTION

Following below are more detailed descriptions of concepts related to, and implementations of, methods, apparatuses, and systems for an integrated tailgate assembly. The figures illustrate exemplary implementations in detail and the present disclosure is not limited to the details or methodology set forth in the description or illustrated in the figures. The terminology used herein is for the purpose of description only and should not be regarded as limiting.

Referring to the figures generally, the various implementations disclosed herein relate to systems, apparatuses, and methods for an integrated tailgate assembly that is movable between a stowed position, an open position, and a step position. In the step position, the integrated tailgate assembly extends generally downward toward the ground (e.g., at a 135-degree angle relative to the stowed position) and provides a step surface the eases user access to a bed of a vehicle.

Figure 1:
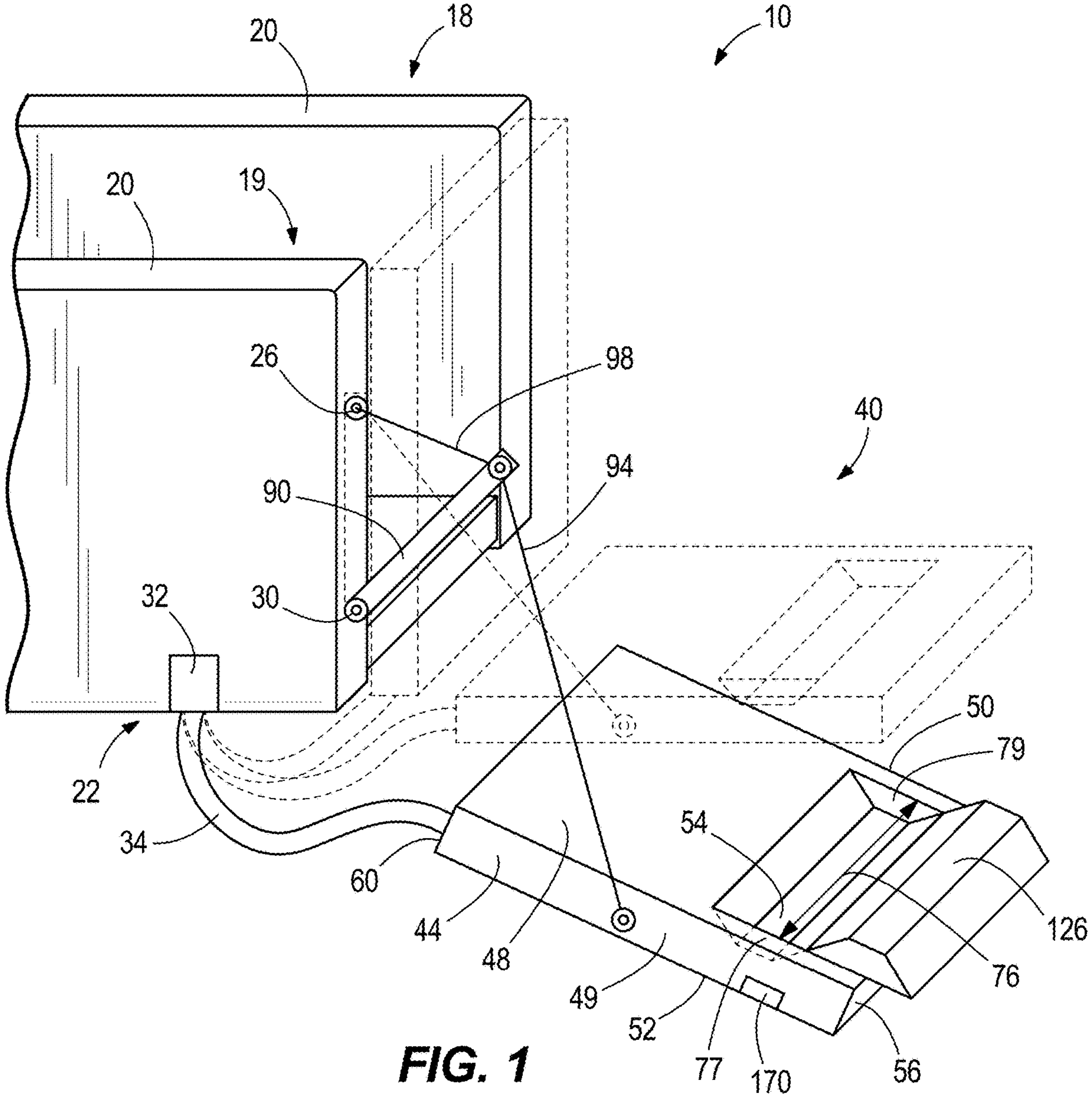
FIG. 1 is a perspective view of a bed of a vehicle including an integrated tailgate assembly, according to some implementations.

As shown in FIG. 1, a rear portion of a vehicle 10 (e.g., a battery electric vehicle, a pickup truck, a sports utility vehicle, a compact utility vehicle) includes a rear storage compartment in the form of a bed 18. In some implementations, the rear storage compartment is positioned within the vehicle (e.g., in a sport utility vehicle body type). The bed 18 includes a floor 19 extending between walls 20 (only one wall 20 is visible in FIG. 2). The floor 19 defines a floor plane that is parallel to a ground plane. The bed 18 also includes a tailgate mounting interface 22 having an upper connecting member interface 26, a lower connecting member interface 30, and a tailgate hinge interface 32. In some implementations, the tailgate mounting interface 22 is rigidly connected to a subframe or frame of the vehicle 10. In some implementations, the tailgate mounting interface 22 is rigidly connected to a combination of the bed 18 and a frame of the vehicle 10. In some implementations, the tailgate mounting interface 22 is directly connected to the bed 18.

Figure 2:
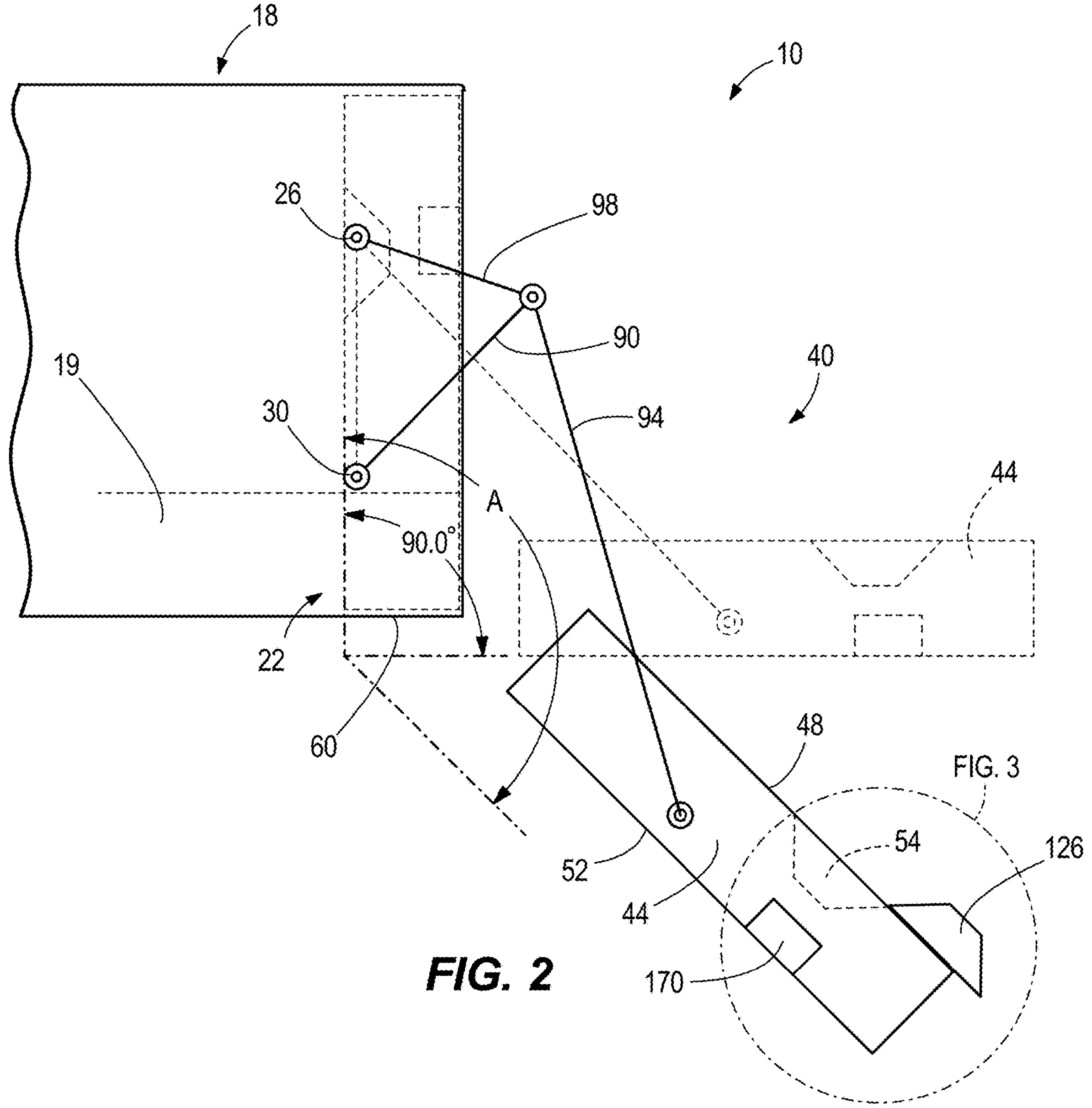
FIG. 2 is a side view of the integrated tailgate assembly of FIG. 1.

As shown in FIG. 1, an integrated tailgate assembly 40 includes a tailgate 44 that is movable between a closed position with the tailgate 44 engaged with the bed 18 (e.g., in a vertical orientation), an open position with the tailgate 44 extending parallel with the floor 19 (e.g., arranged 90 degrees relative to the closed position, in a horizontal orientation, parallel to the floor plane, etc.), and a step position with the tailgate 44 rotated relative to the closed position by a step position angle A (see FIG. 2). In some implementations, the step position angle A is 135 degrees. In some implementations, the step position angle A is 130 degrees to 140 degrees. In some implementations, the step position angle A is 120 degrees to 150 degrees.

The tailgate 44 includes an inner surface 48, an outer surface 52, a top surface 56, and a bottom surface 60 extending between respective ends of the inner surface 48 and outer surface 52. In addition, the tailgate 44 includes a first or left side surface 49 and a second or right side surface 50. The left side surface 49 and right side surface 50 are, in some implementations, parallel to the walls 20 of the bed 18. In some implementations, the left side surface 49 and right side surface 50 are received within corresponding features in the walls 20 of the bed 18. As shown in FIGS. 1-2, the inner surface 48 faces the interior of the bed 18 in the closed position. In some implementations, the outer surface 52 can define a rear facia for the vehicle 10. In some implementations, the outer surface 52 can include lighting for the vehicle 10, such as position or brake lights. In some implementations, in the open position, the inner surface 48 of the tailgate 44 can be generally coplanar with a plane defined by a surface of the floor 19 of the bed 18.

The integrated tailgate assembly 40 generally includes a first connecting member, a second connecting member, and a third connecting member. In some implementations, the first connecting member is in the form of a rigid link 90, the second connecting member is in the form of a first cable 94, and the third connecting member is in the form of a second cable 98. The rigid link 90, the first cable 94, and the second cable 98 connect the tailgate 44 to the upper connecting member interface 26, the lower connecting member interface 30, or a combination thereof. The rigid link 90, the first cable 94, and the second cable 98 generally allow the tailgate 44 to be movable between the closed position, open position, and step position. The rigid link 90 and the first cable 94, in some implementations, operate to maintain the tailgate 44 in the open position. The second cable 98, in some implementations, operates in conjunction with the rigid link 90 and the first cable 94 to maintain the tailgate 44 in the step position by constraining a degree of rotation of the rigid link 90 and/or the first cable 94.

The first connecting member (e.g., the rigid link 90), in some implementations, is rigid or otherwise inflexible. In some implementations, the second connecting member (e.g., the first cable 94) and/or the third connecting member (e.g., the second cable 98) are flexible such that, when the tailgate 44 is in the closed position, the second connecting member and/or third connecting member fold, spool, or otherwise assume a stored configuration different from a deployed configuration, when the tailgate 44 is in the open position and/or step position. In some implementations, the third connecting member (e.g., the second cable 98) is a rigid or otherwise inflexible member configured to constrain the rotation of the first connecting member (e.g., the rigid link 90) in the step position of the tailgate 44.

In some implementations, the rigid link 90, the first cable 94, and the second cable 98 connect one of the side surfaces 49, 50 of the tailgate 44 to the vehicle 10 and/or bed 18. In some implementations, the integrated tailgate assembly 40 includes a pair of first connecting members (e.g., two rigid links 90), a pair of second connecting members (e.g., two first cables 94), and a pair of third connecting members (e.g., two second cables 98), with one of each of the pairs of connecting members configured to connect the left side surface 49 and right side surface 50 of the tailgate 44, respectively, to the vehicle 10 and/or bed 18 (e.g., the first of the pairs of first connecting member, second connecting member, and third connecting member interfacing with left side surface 49 and the second of the pairs of first connecting member, second connecting member, and third connecting member interfacing with a right side surface 50).

As shown in FIG. 1, the rigid link 90 is rotatably connected to the lower connecting member interface 30 to allow rotation of the rigid link 90 relative to the vehicle 10 and/or bed 18 between a stowed rigid link position (see broken lines in FIG. 1) and a step rigid link position (see solid lines in FIG. 1). The lower connecting member interface 30 can include a hinge, a pin sized and configured to be received in a corresponding opening, a bearing, or other suitable rotating mechanisms for allowing the rigid link 90 to rotate relative to the vehicle 10 and/or bed 18. In some implementations, the lower connecting member interface 30 can include a translation component, such as a pin received in a corresponding channel. The rigid link 90 is also selectively engaged with the upper connecting member interface 26. In the closed position and the open position, the rigid link 90 is engaged with the upper connecting member interface 26 and maintained in the stowed rigid link position as shown in broken lines in FIG. 1. In the step position, the upper connecting member interface 26 releases the rigid link 90 thereby allowing rotation to the step rigid link position shown in solid lines in FIG. 1.

As shown in FIG. 1, the first cable 94 is connected to an upper end of the rigid link 90 to allow at least partial rotation of the first cable 94 relative to the rigid link 90. The connection between the rigid link 90 and the first cable 94 can be a weld, a bolted joint, a pin sized and configured to be received in a corresponding opening, a hinge, a bearing, or any other suitable coupling mechanism for allowing at least partial rotation of the first cable 94 relative to the rigid link 90. The first cable 94 is also connected to the tailgate 44 and generally constrains the location of the tailgate 44 in the open position, the step position, or a combination thereof. In some implementations, the first cable 94 is rotatably connected to the tailgate 44 to allow rotation of the first cable 94 relative to the tailgate 44. In some implementations, the first cable 94 is connected to the left side surface 49 between the bottom surface 60 and the top surface 56.

The second cable 98 is connected between the upper connecting member interface 26 and the upper end of the rigid link 90 and generally restrains the location of the tailgate 44 in the step position. The second cable 98 defines the angle of rotation of the rigid link 90 between the stowed rigid link position and the step rigid link position.

As shown in FIG. 1, the vehicle 10 includes a hinge 34 connecting the integrated tailgate assembly 40 to the tailgate hinge interface 32. In some implementations, the hinge 34 is an S-shaped hinge. The hinge 34 rotates and/or translates to permit the tailgate 44 to rotate about and/or translate from an axis of the hinge 34 between the closed position, the open position, and the step position. As shown in FIG. 1, the hinge 34 can be mounted proximal a lower end of the tailgate 44 (e.g., on or adjacent to the bottom surface 60).

Figure 3:
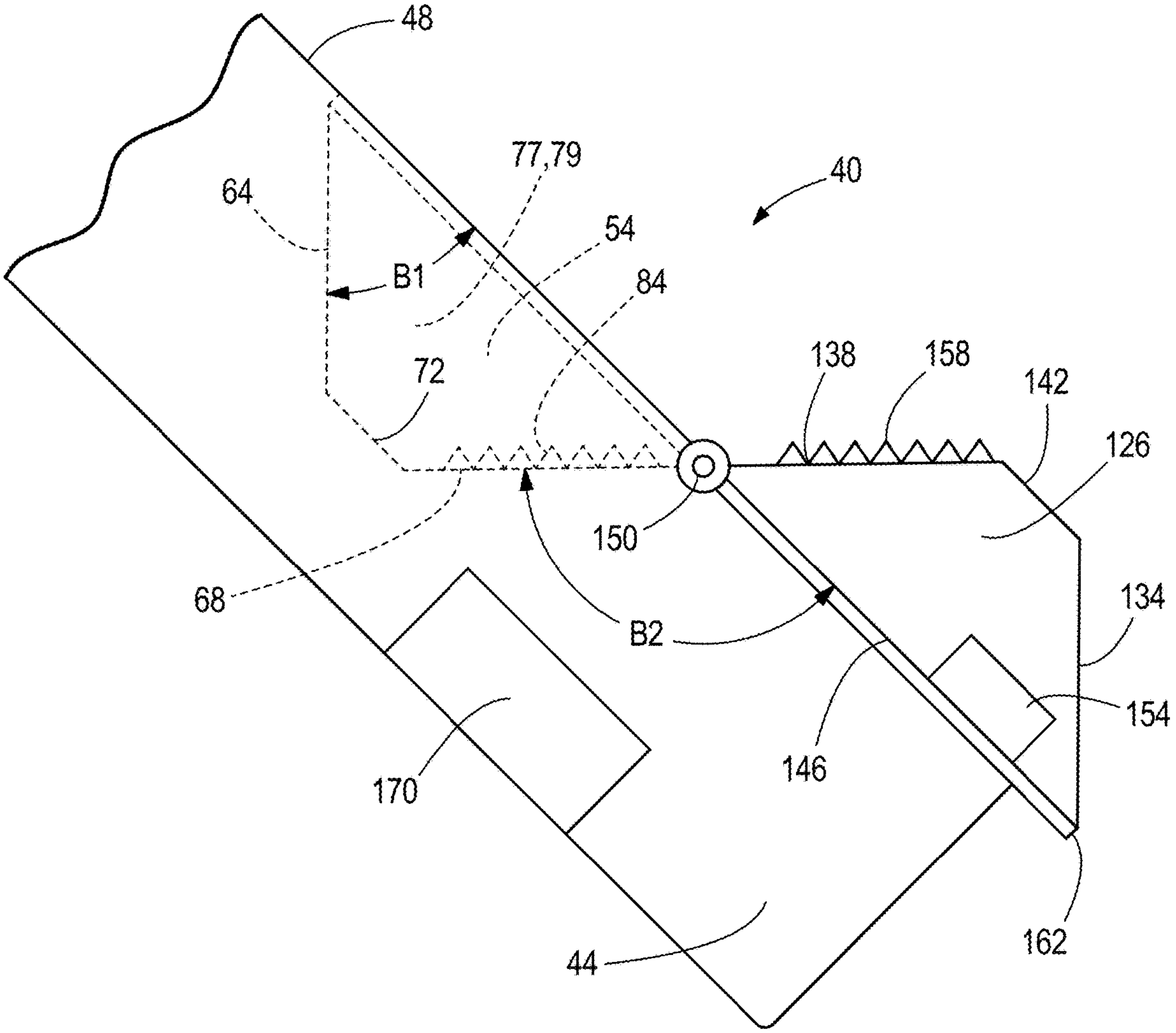
FIG. 3 is a detail view of the integrated tailgate assembly of FIG. 1 showing a deployable platform in a step arrangement, according to some implementations.

As shown in FIG. 3, the inner surface 48 of the tailgate 44 defines a cavity 54. The cavity 54 is generally configured to receive a deployable platform 126. The cavity 54 includes a first angled wall 64 and a second angled wall 68 extending from the inner surface 48, joining at a bottom wall 72. The cavity 54 defines a width 76 in a direction running between the left side surface 49 and the right side surface 50 of the tailgate 44. In some implementations, the width 76 is 24 inches. In some implementations, the width 76 is 18 inches to 32 inches. In some implementations, the width 76 is 20 percent of a tailgate width. In some implementations, the width 76 is 15 to 50 percent of the tailgate width. In some implementations the width 76 extends along the entire width of the tailgate 44. The width 76 of the cavity 54 extends longitudinally along the inner surface 48 between the left side surface 49 and the right side surface 50 of the tailgate 44. In some implementations, the width 76 of the cavity 54 extends through the left side surface 49 and right side surface 50 of the tailgate 44, such that the cavity 54 projects through the left side surface 49 and the right side surface 50. In some implementations, the width 76 of the cavity 54 is less than the distance between the left side surface 49 and the right side surface 50 of the tailgate 44, such that the width 76 extends between a first end 77 and a second end 79 of the cavity 54. In some implementations, the width 76 of the cavity 54 is configured to provide a stepping surface for a user when the tailgate 44 is in the step position. For example, the width 76 of the cavity 54 can generally be configured to receive a user's foot (e.g., the width 76 is equal to or greater than a width of a user's foot).

In some implementations, the first angled wall 64 extends at a first platform step angle B1 relative to the inner surface 48 of the tailgate 44. In some implementations, the platform step angle B1 is 45 degrees (e.g., 45 degrees below a plane defined by the inner surface 48). In some implementations, the platform step angle B1 is 30 degrees to 50 degrees (e.g. 30 degrees to 50 degrees below a plane defined by the outer surface 52). In some implementations, the bottom wall 72 is parallel to the inner surface 48 and/or outer surface 52 of the tailgate 44. In some implementations, the second angled wall 68 extends at a second platform step angle B2 relative to the inner surface 48. In some implementations, the platform step angle B2 is 135 degrees (e.g., 135 degrees below a plane defined by the inner surface 48). In some implementations, the platform step angle B2 is 130 degrees to 150 degrees (e.g., 130 to 150 degrees below a plane defined by the outer surface 52).

The second angled wall 68 is generally configured to provide a stepping surface for a user when the tailgate 44 is in the step position. The second angled wall 68 extend towards the outer surface 52 at the platform step angle B2 such that, when the tailgate 44 is in the step-position, the second angled wall 68 is parallel to a ground plane and/or a plane defined by the floor 19 of the bed 18. The second angled wall 68 can, in some implementations, define a grip surface 84. In some implementations, the grip surface 84 includes, for example, a plurality of ridges, protrusions, and/or a textured surface providing a degree of slip resistance for a user's foot.

As shown in FIG. 3, the integrated tailgate assembly 40 includes the deployable platform 126 sized to be received within the cavity 54 of the tailgate 44. The deployable platform 126 is movable between a stored step position and a deployed step position. The deployable platform 126 provides a stepping surface for a user's foot when arranged in the deployed step position.

The deployable platform 126 defines a generally trapezoidal cross-section including a first angled surface 134 and a second angled surface 138 extending between a bottom surface 142 and a top surface 146. The top surface 146, in some implementations, is larger than the bottom surface 142. The first angled surface 134 generally corresponds to the first angled wall 64 of the cavity 54. Similarly, the second angled surface 138 generally corresponds to the second angled wall 68 of the cavity 54 and the bottom surface 142 generally corresponds to the bottom wall 72 of the cavity 54. The deployable platform 126 is sized to be received within the width 76 of the cavity 54. The second angled surface 138, in some implementations, defines a grip surface 158. In some implementations, the grip surface 158 includes, for example, a plurality of ridges, protrusions, and/or a textured surface providing a degree of slip resistance for a user's foot. In some implementations, the top surface 146 includes a platform cover 162. The platform cover 162 can be formed integrally to the deployable platform 126 or coupled to the deployable platform 126. The platform cover 162 is configured to cover the cavity 54 to mitigate the intrusion of dust and debris into the cavity 54, when the deployable platform 126 is in the stored position. In addition, the platform cover 162, in some implementations, provides a continuous, seamless, flush, or coplanar transition between the inner surface 48 of the tailgate 44 and the top surface 146 of the deployable platform 126.

The deployable platform 126 generally includes a rotatable coupling 150 for mounting the deployable platform 126 to the tailgate 44. In some implementations, the rotatable coupling 150 can include a hinge, a pin sized and configured to be received in a corresponding opening, a bearing, or other suitable rotating mechanisms for allowing the deployable platform 126 to rotate relative the tailgate 44. The rotatable coupling 150 generally includes a portion that is mounted to the tailgate 44 and a portion that is mounted to the deployable platform 126. The rotatable coupling 150 can be disposed at a location proximal the joining of the second angled surface 138 and the top surface 146 of the deployable platform 126. In some implementations, the rotatable coupling 150 can be at least partially received within an opening in the inner surface 48 of the tailgate 44. In some implementations, the rotatable coupling 150 can be at least partially received within an opening in the deployable platform 126. The rotatable coupling 150 allows the deployable platform 126 to rotate about a longitudinal axis, the longitudinal axis parallel to a longitudinal axis of the tailgate 44. As a result, the rotatable coupling 150 permits the deployable platform 126 to be movable between the stored step position, where the deployable platform 126 is received within the cavity 54 of the tailgate 44 such that the bottom surface 142 of the deployable platform 126 generally abuts the bottom surface 60 of the cavity 54, and the deployed step position, where the deployable platform 126 is rotated approximately 180 degrees until the top surface 146 of the deployable platform 126 generally abuts the inner surface 48 of the tailgate 44, as shown in FIGS. 1 and 3.

As shown in FIG. 3, in the deployed condition, the deployable platform 126 is oriented such that the second angled surface 138 aligns with the second angled wall 68 of the cavity 54. In some implementations, in the deployed condition, the second angled surface 138 is parallel to the second angled wall 68 of the cavity 54. In some implementations, in the deployed condition, the second angled surface 138 is coplanar with the second angled wall 68 of the cavity 54. As shown in FIG. 3, in the deployed condition, the combination of the second angled surface 138 and the second angled wall 68 provide a stepping surface for a user's foot. As shown in FIG. 3, with the tailgate 44 in the step position and the deployable platform 126 deployed, the combination of the second angled surface 138 and the second angled wall 68, with respective grip surface 84 and grip surface 158, provides a stepping surface for a user's foot that is parallel to a ground plane and/or a plane of the floor 19 of the bed 18.

The deployable platform 126 includes a platform user interface 154 configured to enable a user to move the deployable platform 126 between the stored and the deployed position. In some implementations, the platform user interface 154 includes a handle disposed in the deployable platform 126 to manually rotate the deployable platform 126 about the rotatable coupling 150. In some implementations, the platform user interface 154 includes a releasable latch mechanism for releasably locking the deployable platform 126 in the cavity 54 of the tailgate 44. In some implementations, the platform user interface 154 includes an electromechanical deployment mechanism, such that activation of the platform user interface 154 prompts a powered mechanism to move the deployable platform 126 between a stored position and a deployed position.

As shown in FIGS. 1-3, the integrated tailgate assembly 40 includes a tailgate latch user interface 170 configured to selectively engage and disengage tailgate positional latch mechanisms configured for releasably locking the position of a portion of the integrated tailgate assembly 40 in the closed position, open position, step position, or a combination thereof. In some implementations, the tailgate latch user interface 170 includes a plurality of latch interfaces. In some implementations, the tailgate latch user interface 170 includes a mechanical actuation mechanism and/or an electromechanical actuation mechanism. The latch user interface 170 can include a first latch release interface generally configured for engaging a latch mechanism that releasably locks the position of the tailgate 44 in the closed position. Engaging the tailgate latch user interface 170 permits the tailgate 44 to rotate from the closed position to the open position. In some implementations, the tailgate latch user interface 170 includes a handle, a button, or other suitable user interfaces for engaging and/or disengaging the latch mechanism(s). In some implementations, the tailgate latch user interface 170 is disposed on the outer surface 52 of the tailgate 44. When a user activates the tailgate latch user interface 170, the tailgate 44 is released from the closed position and can rotate to the open position. As described above, the rotational position of the tailgate 44 in the open position is defined or otherwise constrained by the length of the first cable 94 and/or rigid link 90.

The latch user interface 170 can include a second latch release interface generally configured for engaging a latch mechanism that releasably locks the position of the tailgate 44 in the open position. As a result, engaging the second latch release interface of the tailgate latch user interface 170 permits the tailgate 44 to rotate from the open position to the step position. In some implementations, the second latch release interface includes a handle, a button, or other suitable user interfaces. In some implementations, the second latch release interface of the tailgate latch user interface 170 is disposed on the outer surface 52 of the tailgate 44. In some implementations, the second latch release interface of the tailgate latch user interface 170 is proximal to, integral to, or formed as a part of the upper connecting member interface 26, the lower connecting member interface 30 or another portion of the integrated tailgate assembly 40.

In operation, with the integrated tailgate assembly 40 arranged in the closed position, the user engages the tailgate latch user interface 170 thereby releasing the tailgate 44 from the tailgate mounting interface 22 and allowing the first cable 94 to extend and the tailgate 44 to actuate to the open position on the hinge 34. When in the open position, the tailgate 44 is parallel to the floor plane of the bed 18 and the deployable platform 126 is arranged in the stowed step position with the platform cover 162 inhibiting ingress of dirt and debris into the cavity 54. The user can then further engage the tailgate latch user interface 170 to release the rigid link 90 from the upper connecting member interface 26 and allow the rigid link 90 to rotate about the lower connecting member interface 30 thereby allowing the second cable 98 to extend, and the tailgate 44 to rotate into the step position about the hinge 34. When the tailgate 44 is arranged in the step position, the deployable platform 126 can be moved to the deployed step position and the user can utilize the step surface to enter the bed 18, use the step surface as a seat, or otherwise utilize the functions of the integrated tailgate assembly 40.

The integrated tailgate assembly 40 provides the multi-use tailgate 44 that allows easier access in the bed 18, a usable tailgate seat, an angled surface that can be used as a ramp for bed 18 entry, and allows a user to be nearer the bed 18 physically to make reaching into the bed 18 space easier. In the open position, the tailgate 44 can be used as a seat. In the step position, the tailgate 44 can function as a ramp to provide additional access to bed 18. Further, in the step position, the tailgate 44 allows a user to be nearer the bed 18 physically to make reaching into the bed 18 space easier, since the distance between the user and the bed 18 is reduced.

CONCLUSION

For purposes of this description, certain advantages and novel features of the aspects and configurations of this disclosure are described herein. The described methods, systems, and apparatus should not be construed as limiting in any way. Instead, the present disclosure is directed toward all novel and nonobvious features and aspects of the various disclosed aspects, alone and in various combinations and sub-combinations with one another. The disclosed methods, systems, and apparatus are not limited to any specific aspect, feature, or combination thereof, nor do the disclosed methods, systems, and apparatus require that any one or more specific advantages be present or problems be solved.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

Features disclosed in this specification (including any accompanying claims, abstract, and drawings), and/or all of the steps of any method or process so disclosed, may be combined in any combination, except combinations where at least some of such features and/or steps are mutually exclusive. The claimed features extend to any novel one, or any novel combination, of the features disclosed in this specification (including any accompanying claims, abstract, and drawings), or to any novel one, or any novel combination, of the steps of any method or process so disclosed.

As used in the specification and the appended claims, the singular forms “a”, “an”, and “the” include plural referents unless the context clearly dictates otherwise. Ranges may be expressed herein as from “about” one particular value, and/or to “about” another particular value. When such a range is expressed, another aspect includes from the one particular value and/or to the other particular value. Similarly, when values are expressed as approximations, by use of the antecedent “about”, it will be understood that the particular value forms another aspect. It will be further understood that the endpoints of each of the ranges are significant both in relation to the other endpoint, and independently of the other endpoint. The terms “about” and “approximately” are defined as being “close to” as understood by one of ordinary skill in the art. In one non-limiting aspect the terms are defined to be within 10%. In another non-limiting aspect, the terms are defined to be within 5%. In still another non-limiting aspect, the terms are defined to be within 1%.

The terms “coupled”, “connected”, and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another. If “coupled” or variations thereof are modified by an additional term (e.g., directly coupled), the generic definition of “coupled” provided above is modified by the plain language meaning of the additional term (e.g., “directly coupled” means the joining of two members without any separate intervening member), resulting in a narrower definition than the generic definition of “coupled” provided above. Such coupling may be mechanical, electrical, or fluidic.

Certain terminology is used in the following description for convenience only and is not limiting. The words “right”, “left”, “lower”, and “upper” designate direction in the drawings to which reference is made. The words “inner” and “outer” refer to directions toward and away from, respectively, the geometric center of the described feature or device. The words “distal” and “proximal” refer to directions taken in context of the item described and, with regard to the instruments herein described, are typically based on the perspective of the practitioner using such instrument, with “proximal” indicating a position closer to the practitioner and “distal” indicating a position further from the practitioner. The terminology includes the above-listed words, derivatives thereof, and words of similar import.

Throughout the description and claims of this specification, the word “comprise” and variations of the word, such as “comprising” and “comprises”, means “including but not limited to”, and is not intended to exclude, for example, other additives, components, integers or steps. “Exemplary” means “an example of” and is not intended to convey an indication of a preferred or ideal aspect. “Such as” is not used in a restrictive sense, but for explanatory purposes.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description but is not intended to be exhaustive or limited to the form disclosed. Many modifications and variations will be apparent to those of ordinary skill in the art without departing from the scope and spirit of the present disclosure.

What is claimed is:

1. An integrated tailgate assembly for a vehicle, the integrated tailgate assembly comprising:

- a first connecting member rotatably coupled to the vehicle and movable between a stowed first connecting member position and a step first connecting member position;
- a second connecting member coupled to the first connecting member;
- a tailgate coupled to the vehicle and the second connecting member, the tailgate moveable between:
  - a closed position with the first connecting member in the stowed first connecting member position,
  - an open position with the first connecting member in the stowed first connecting member position, and
  - a step position with the first connecting member in the step first connecting member position; and
- a deployable platform rotatably coupled to the tailgate and moveable between:
  - a stored position, and
  - a deployed position providing a step,
- wherein the first connecting member is a rigid link and the second connecting member is a cable.

2. The integrated tailgate assembly of claim 1, wherein, in the step position, the tailgate is rotated 130 degrees to 140 degrees from the closed position.

3. The integrated tailgate assembly of claim 1, wherein, in the deployed position, the deployable platform is rotated 180 degrees from the stored position.

4. The integrated tailgate assembly of claim 1, wherein the tailgate defines a cavity sized to receive the deployable platform.

5. The integrated tailgate assembly of claim 4, wherein the cavity defines a cavity width less than a width of the tailgate.

6. The integrated tailgate assembly of claim 4, wherein the cavity includes a first angled wall and a second angled wall joining at a bottom wall, and

- wherein the second angled wall defines a cavity grip surface configured to be parallel to a floor plane of the vehicle when the tailgate is in the step position and the deployable platform is in the deployed position.

7. The integrated tailgate assembly of claim 6, wherein the second angled wall extends at a platform step angle of 130 degrees to 140 degrees relative to a tailgate inner surface plane.

8. The integrated tailgate assembly of claim 6, wherein the deployable platform includes a first angled surface and a second angled surface extending between a bottom surface and a top surface, the second angled surface defining a deployable platform grip surface and the top surface defining a platform cover configured to inhibit ingress of debris into the cavity.

9. The integrated tailgate assembly of claim 8, wherein the cavity grip surface and the deployable platform grip surface are parallel in the deployed position.

10. The integrated tailgate assembly of claim 1, further comprising a third connecting member coupled between the first connecting member and the vehicle, the third connecting member configured to define the step first connecting member position of the first connecting member.

11. The integrated tailgate assembly of claim 10, wherein the third connecting member is a cable.

12. The integrated tailgate assembly of claim 1, further comprising a platform user interface that controls actuation of the deployable platform between the stored position and the deployed position.

13. The integrated tailgate assembly of claim 1, wherein the deployable platform includes a platform cover that is flush with an inner surface of the tailgate when the deployable platform is arranged in the closed position.

14. An integrated tailgate assembly for a vehicle, the integrated tailgate assembly comprising:

- a first connecting member rotatably coupled to the vehicle and movable between a stowed first connecting member position and a step first connecting member position;
- a second connecting member coupled to the first connecting member;
- a third connecting member coupled between the first connecting member and the vehicle, the third connecting member configured to define the step first connecting member position;
- a tailgate coupled to the vehicle and the second connecting member, the tailgate moveable between:
  - a closed position with the first connecting member in the stowed first connecting member position, and
  - a step position with the first connecting member in the step first connecting member position; and
- a deployable platform rotatably coupled to the tailgate and moveable between:
  - a stored position, and
  - a deployed position providing a step,
- wherein the first connecting member is a rigid link and the second connecting member is a cable.

15. The integrated tailgate assembly of claim 14, wherein, in the step position, the tailgate is rotated 130 degrees to 140 degrees from the closed position.

16. The integrated tailgate assembly of claim 14, wherein the tailgate defines a cavity sized to receive the deployable platform.

17. An integrated tailgate assembly for facilitating access to a vehicle storage compartment of a vehicle, the integrated tailgate assembly comprising:

- a rigid link rotatably coupled to the vehicle and movable between a first rigid link position and a second rigid link position;
- a first cable coupled to the rigid link;
- a second cable coupled between the rigid link and the vehicle, the second cable configured to define the second rigid link position;
- a tailgate coupled to the vehicle and the first cable, the tailgate moveable between:
  - a closed position with the rigid link in the first rigid link position,
  - an open position with the rigid link in the first rigid link position, and
  - an extended position with the rigid link in the second rigid link position;
- a deployable platform, the deployable platform coupled to the tailgate and sized to be received within an opening in the tailgate, the deployable platform moveable between:

a closed position, and
an open position;

a deployable platform user interface that controls movement of the deployable platform between the closed position and the open position;

a tailgate latch user interface that controls movement of the rigid link between the first rigid link position and the second rigid link position and the tailgate between the closed position, the open position, and the extended position;

wherein, in the extended tailgate position and the open deployable platform position, a surface of the deployable platform and a surface of the opening in the tailgate form a stepping interface.

18. The integrated tailgate assembly of claim 17, wherein the stepping interface includes a plurality of protrusions or ridges or a textured surface.

* * * * *